March 1, 1932.  J. V. MARTIN  1,847,094
AEROPLANE WING STRUCTURE
Filed June 16, 1928   3 Sheets-Sheet 1
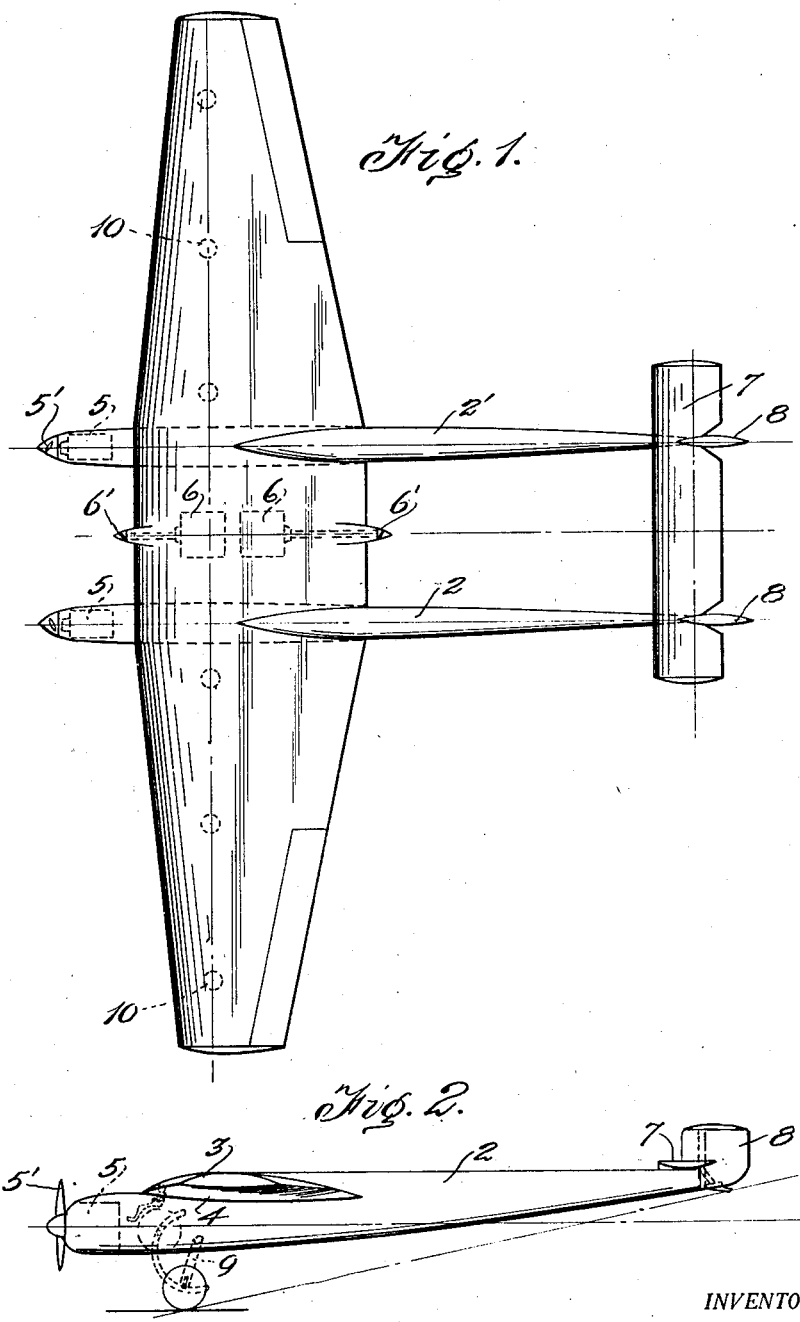
INVENTOR.
James V. Martin

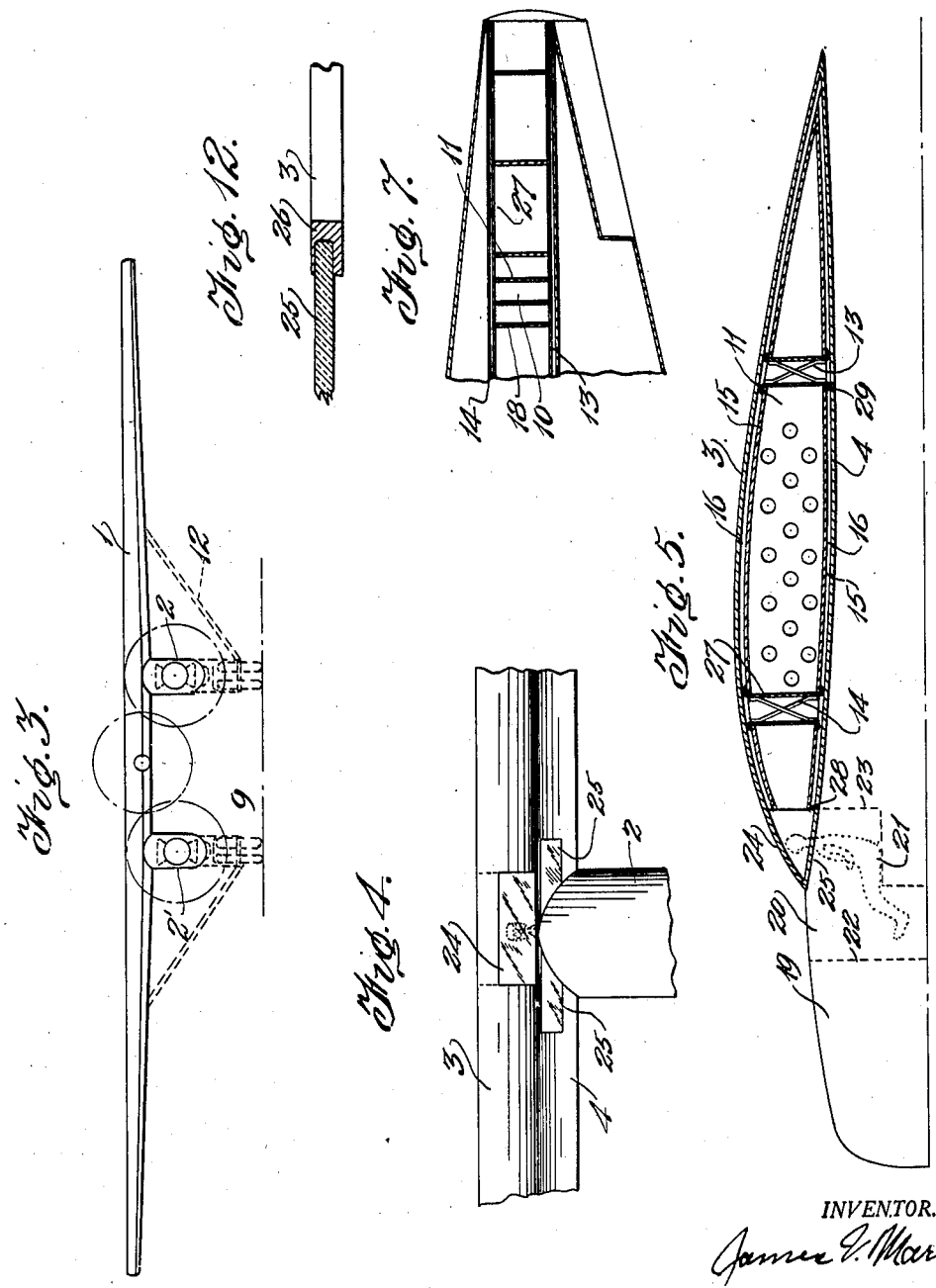

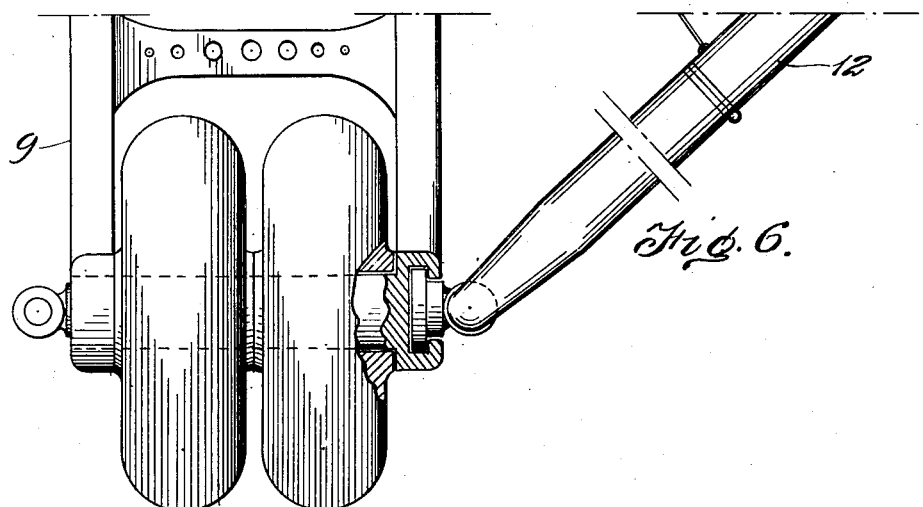
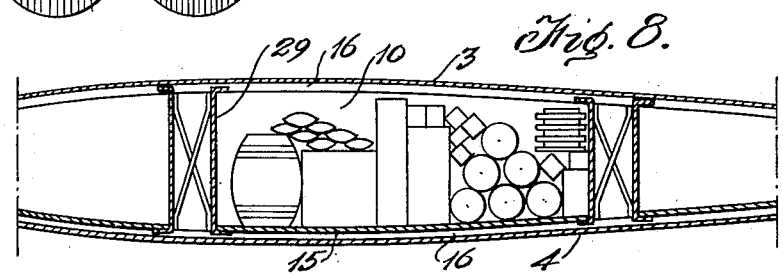
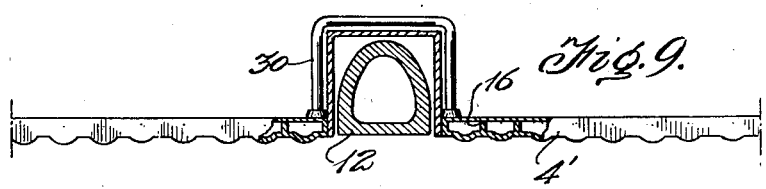
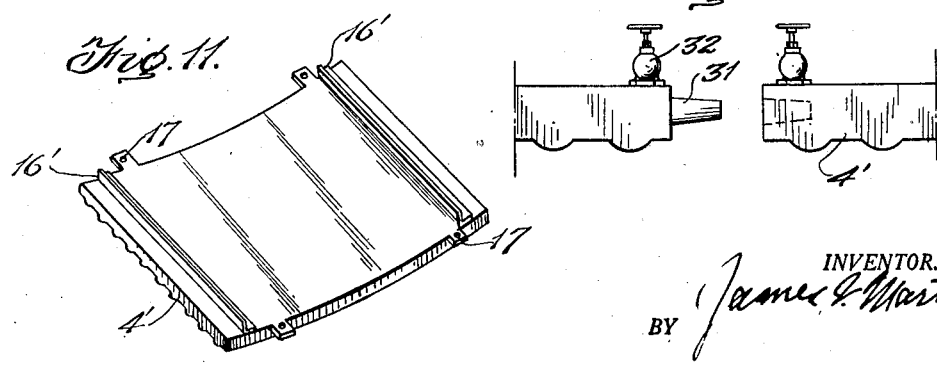

Patented Mar. 1, 1932

1,847,094

UNITED STATES PATENT OFFICE

JAMES V. MARTIN, OF GARDEN CITY, NEW YORK

AEROPLANE WING STRUCTURE

Application filed June 16, 1928. Serial No. 285,827.

The subject matter as shown in Figs. 6, 8, 9, 10 and 11 is identical with that disclosed in my co-pending application Serial No. 675,156, filed November 16, 1923.

The primary object of my invention is to simplify the aeroplane wing structure by combining aerodynamic and structural advantages, eliminating unnecessary duplication of material and preserving the best form for wings and bodies.

The advantages of using a continuously convex type of lower wing surface are gradually being recognized as producing lifting area with less drag than the so-called high-lift or concave lower surface wing sections, but I have gone a step further in this application and in my prior disclosure referred to above, by combining the lower convex surface with the radiator and making the said radiator part of the structural strength of the wing and using the two surfaces which confine the cooling fluid to form, with suitable bracing, an integral part of the wing structure. It has also been practice to inclose gasoline or fuel tanks within the wing structure, but I disclose a type of wing bracing which is itself a tank having a double wall for the strength of the wing and also for the strength of the tank which sections of the wing provide, and in portions of the wing the radiator walls function not only to cool the circulating fluid and to strengthen the wing, but they also form part of the wing fuel tank.

Another object of my invention is to dispose the power units so that they create the least possible drag and so that, in case of stopping one motor, the remaining motors will drive the plane at minimum disadvantage from the standpoint of control.

Other advantages of my invention will become apparent from the following description:—Fig. 1 is a plan view of my invention looking down upon the top of the wing. Fig. 2 is a side elevation showing in dotted lines the motor, aviator and the chassis retracted.

Fig. 3 is a front elevation of the invention showing the chassis in extended position in dotted lines. Fig. 4 is an enlarged view of the pilot's position inclosed within a combination of fuselage and part of the wing. Fig. 5 is an enlarged sectional view showing the wing, tank and radiator structure and in dotted lines the pilot's cab to rearward of the motor compartment.

Fig. 6 is an enlarged view of one of the chassis showing the brace leading to the under part of the wing on one side. Fig. 7 is a section of the wing with the top cover removed to show the positions of the sections which form the tanks and useful load compartments.

Fig. 8 is a cross section of the wing showing one of the sections such as those indicated by the numeral 10 of Fig. 1, to a scale adapted for people to walk about upright within the wing.

Fig. 9 shows a typical portion of the under wing surface where the brace 12 is retracted within a section of the skin type radiator. Fig. 10 shows the valves which permit the coupling of sections of the surface type radiator while Fig. 11 shows a section of the radiator with the angle irons and other attachments to make it part of the wing structure. Fig. 12 is an enlarged sectional view of the transparent material for the pilot's vision as shown in Fig. 4 and indicates how the panels of such material are slidable in an air tight packing.

Having regard now to the more detailed description 1 is the main wing of the aeroplane, 2 is the fuselage or body on the left side and 2' that on the right side of Fig. 1. 3 indicates the top surface of the wing 1, and 4 the bottom, while 5 indicates either of the fuselage motors and 6 either of the wing motors; 5' the fuselage propellers and 6' the wing propellers; 7 is the rear horizontal control while 8 indicates either rudder. 9 indicates either retractable chassis and 10 any of the useful load or fuel compartments; 11 indicates the baffle plates in the tank 10 and 12 is one of the wing braces which retract with the chassis. 13 is the rear and 14 the front spar of the wing. 15 indicates the inner wing wall firmly united with the outer wing surface by angle irons 16 which the sheet surfaces are held in place by. Other angle irons 16' serve to give additional strength to the radiator or wing covering sections so that by means of suitable attachments or connections indicated at 17 they may be assembled to form the wing structure and may be bolted to each other, thus providing a type of wing and radiator structure which permits a damaged section to be readily replaced or the wing to be dissembled without injury to its parts. 18 indicates one of the division partitions of a tank or compartment which unlike the baffle plates 11 would be leak proof not having the holes shown in the baffle plate. 19 is the typical motor compartment in front of the fuselage, separated from the pilot's cab 20 by a fire proof partition 22, which, never-the-less has a means of opening so that repairs can be made by the pilot, 21; a rear wall 23 extends from the bottom of the cab to the top inside of the upper wing surface behind the pilot's head, while transparent panels 24 and 25 slide in packing 26 so that the cab may be supercharged by the motor supercharger for altitude comfort, but, on occasion the pilot may slide the panel over his head to rearward as indicated by dotted lines in Fig. 4 or he may slide either panel 25 to one side in the wing covering. As shown in Fig. 12 the packing is so arranged in the wing surface that the external surface of the panel is substantially flush with the rest of the wing surface thus causing no disturbance of the air and at the same time providing vision in all directions, forward, up and down for the entirely inclosed pilot: It is contemplated that a pilot's cab shall be in both fuselages and that duplicate controls are provided subject to alternate use. 27 indicates the inside plate of the forward spar 14 and may be leak proof where needed to form the front wall of the fuel tank. In very large scale craft the cross pieces in the spars, shown as forming an X may be omitted and then the wall 27, being U shaped as shown, could become the spar and wall uniting with the top and bottom sheets through the angle irons as shown and with a like member as the rear spar and this combination would form a box section which would make of the entire central wing section a single spar giving all of the wing adequate strength. This strength will be greatly increased of course by my novel double type of sheet metal wing covering; either or both of the sheets in this covering may be corrugated as indicated in Figs. 9 and 10, but for aerodynamic efficiency the exposed surface should be smooth. 28 and 29 indicate the forward and rearward limits of the radiator respectively as shown in Fig. 5, and for large planes the radiator need not cover all of the wing area as it was intended to do in my Serial No. 675,156. 30 indicates a pipe lead over the pocket in the lower wing surface, where that surface is composed of the wing radiator and where the wing brace 12 is retracted so that it makes a flush closure of its pocket. 31 indicates a quick attachable type of water connection for the radiator sections, regulated by a valve 32 so that assembly may be done readily.

The baffle plates are flanged and firmly attached to the innermost of the two wing cover sheets. The wing is continuous from tip to tip.

It is understood that suitable piping and valves will be employed to conduct the fluid to and from the motors and tanks and that in the large scale indicated by the useful load compartment shown by Fig. 8 doors will be provided in the walls 27. In retracting the chassis the lower part of 12 below the hinge is retracted within a pocket (see Fig. 9) in the fuselage instead of the wing.

In operation my invention will be very simple and efficient, for example, reserve power should be sufficient to fly the plane safely on any two of its four indicated motors, and the inventive thought comprehends that there shall be much more power in the centrally or wing located motors than in either of those disposed off of the plane's fore and aft center line, thus should both outboard motors quit, the plane would have ample power for safe flight from its central motors 6 and no offset of the rudders would be required to correct a one sided thrust, also should one or more of the centrally located motors quit, the location of the lines of thrust would be symmetrical about the plane's center and should either one of the outboard motors quit, only about 25% of the plane's total power would be missing from one side, i. e. very little off set of control would be necessary to keep the course. The air on the under side of the wing is denser than elsewhere and the convex form lowers the drag and affords depth of wing.

Having thus described one application of my invention I do not care to be restricted to the precise arrangement shown, but what I claim as new and desire to protect is:

1. In combination with an aeroplane wing a metal cover therefor including two spaced apart and rigidly connected sheets of metal forming the under side of the said wing, the upper of said sheets supporting useful load disposed thereon and means of connecting the said sheets to the said wing internal spars so that the said spars and sheets form the principal truss for the said wing.

2. In combination with an aeroplane wing, a double spaced apart sheet metal cover forming with the spars of the said wing the principal truss thereof and partitions connecting rigidly with the top and bottom covers of the said wing to strengthen the same and to confine a fluid there between.

3. An aeroplane wing including wing spars joined to double metal cover sheets spaced apart from each other which form, with said spars, part of the essential strength of the wing, partitions joining the inner of the said sheets to each other so that they form the sides of a tank adapted to hold a fluid against leakage and the said tank provided with perforated baffle plates so connected with the said sheets as to cooperate materially in strengthening the said wing.

4. In combination with an aeroplane wing a tank therein for the retention of a fluid, a radiator formed of two metal sheets held apart in spaced relation, one of the said sheets forming part of the external wing covering and the other part or all of one of the sides of the said tank.

5. An aeroplane wing having a continuously convex lower surface from leading to trailing edge, said lower surface being formed by two sheets of metal rigidly held in spaced apart relation and secured to the internal wing structure so as to form with said structure an essential part of the wing strength and useful load carried by the upper of the said sheets.

6. A wing according to claim 5 and a circulating fluid between said sheets to cool the aeroplane motor.

7. An aeroplane wing including two wing spars located at least their spar depth away from the leading and trailing edges, two spaced apart and rigidly connected sheets of metal connecting the tops of the said spars and two such sheets connected with the bottoms of the said spars, the inner of the said sheets corrugated and lending stiffness through the said spacing to the smooth outer sheet, the said spars and sheets forming a single box section spar to resist torsion and other wing stresses.

8. A wing according to claim 7 wherein a cooling fluid is circulated between the bottom set of said plates and the said bottom is a continuously convex lower surface for the said wing from leading to trailing edge.

9. An aeroplane including two fuselages each supported on the ground by alighting wheels attached thereto, an intervening wing having its trussing located in and within its external skin and housing one or more of the aeroplane motors, the upper and lower surfaces of the said wing being formed of pairs of metal sheets held in spaced apart relation to each other and the inner of said sheets corrugated and attached to wing spars extending from one of the said fuselages to the other.

10. An aeroplane including a fuselage provided with an aeroplane motor in its forward portions, a wing attached to the top of the said fuselage and said wing inclosing and supporting multiple motors.

11. An aeroplane wing truss including two spaced apart metal plates forming the top of the wing profile between two wing spars and another two such plates forming the bottom of the said wing profile and the inside one of each set of said plates being corrugated for additional stiffness.

12. A pilot's cab located partly in the forward portion of an aeroplane wing and partly in the upper part of a fuselage to which the said wing is attached and transparent sliding panels in the said wing portion of the said cab.

13. An aeroplane provided with two fuselages attached to a single internally braced wing extending uninterruptedly across the tops of the said fuselages and two pilot's cabs, one in the combined forward portion of each fuselage and the said wing, the said cabs being entirely inclosed and having transparent panels in the wing portion thereof.

14. In an aeroplane wing the combination of two spaced apart sheets of metal forming with the wing spars the adequate strength of the said wing; the inner of the said sheets being corrugated and lending stiffness through spacing members to the outer of the said sheets, which said outer sheet forms the smooth skin surface of the said wing.

15. A combination according to claim 14 and a cooling fluid circulating between the said sheets.

In testimony whereof I affix my signature.

JAMES V. MARTIN.